(12) United States Patent
Wong et al.

(10) Patent No.: US 8,671,092 B2
(45) Date of Patent: Mar. 11, 2014

(54) APPARATUS, METHOD AND COMPUTER-READABLE STORAGE MEDIUM FOR RETRIEVING DATA FROM A DATA SOURCE

(75) Inventors: Eldon Wong, Vancouver (CA); Euphine Wong, Richmond (CA)

(73) Assignee: McKesson Financial Holdings, Hamilton (BM)

( * ) Notice: Subject to any disclaimer, the term of this patent is extended or adjusted under 35 U.S.C. 154(b) by 157 days.

(21) Appl. No.: 13/075,728

(22) Filed: Mar. 30, 2011

(65) Prior Publication Data

US 2012/0254157 A1  Oct. 4, 2012

(51) Int. Cl.
*G06F 7/00* (2006.01)

(52) U.S. Cl.
USPC .......................................... 707/722

(58) Field of Classification Search
CPC .............. G06F 17/30; G06F 17/30911; G06F 17/30923
USPC ................. 707/802, 803, 809, 769, 705, 722; 715/234, 210
See application file for complete search history.

(56) References Cited

U.S. PATENT DOCUMENTS

| 6,704,736 | B1 * | 3/2004 | Rys et al. ............................... 1/1 |
| 6,871,204 | B2 | 3/2005 | Krishnaprasad et al. |
| 7,337,177 | B2 * | 2/2008 | Rys et al. ...................... 707/769 |
| 7,743,040 | B2 * | 6/2010 | Rys et al. ...................... 707/705 |
| 7,886,224 | B2 * | 2/2011 | Sakai et al. ................... 715/234 |
| 2006/0085409 | A1 * | 4/2006 | Rys et al. .......................... 707/3 |
| 2008/0082571 | A1 * | 4/2008 | Sakai et al. .................. 707/102 |

* cited by examiner

*Primary Examiner* — Hung T Vy
(74) *Attorney, Agent, or Firm* — Alston & Bird LLP (57) ABSTRACT

An apparatus is provided that includes a processor and memory storing executable instructions that in response to execution by the processor cause the apparatus to at least perform a number of operations. The apparatus is caused to receive a rowset of data from a data source, where the rowset includes one or more rows of values from the data source. The apparatus is caused to convert the rowset to markup data, and organize the markup data in preparation for its transformation to an output according to a markup transformation language. The markup data includes, for each row of the rowset, a row markup element; and the organized markup data includes an organization of the row elements into a plurality of logical groups. Even further, the organized markup data may be split into a plurality of smaller markup data sets, which may facilitate transformation of the markup data.

21 Claims, 5 Drawing Sheets

| name | mrn | card_number | ins_co_id | ref_medicalid | service_datetime | units | birthdate |
|---|---|---|---|---|---|---|---|
| [value11] | [value21] | [value31] | [value41] | [value51] | [value61] | [value71] | [value81] |
| [value12] | [value22] | [value32] | [value42] | [value52] | [value62] | [value72] | [value82] |
| ... | ... | ... | ... | ... | ... | ... | ... |
| [value1n] | [value2n] | [value3n] | [value4n] | [value5n] | [value6n] | [value7n] | [value8n] |

APPARATUS, METHOD AND COMPUTER-READABLE STORAGE MEDIUM FOR RETRIEVING DATA FROM A DATA SOURCE

FIELD OF THE INVENTION

The present invention generally relates to retrieving data from a data source, and more particularly, to the conversion of data retrieved from the data source.

BACKGROUND OF THE INVENTION

Databases are prevelant in computer-implemented systems to enable the organization, storage and retrieval of data. Examples of systems that include databases are hospital information systems (HIS), radiology information systems (RIS), picture archiving and communication system (PACS) or the like. These and similar systems include databases that store patient and other medical-industry-relevant data. The retrieval of data from a database is a fairly common task, although the desired content and format of the respective data may vary depending on the application of the data. Techniques have been developed to convert database data to a desired output. However, many of these existing techniques suffer from a number of drawbacks. For example, a number of data conversion techniques are rigid and designed to only address a specific output. Also, for example, a number of data conversion techniques require an undesirable amount of processing and/or memory resources.

SUMMARY OF THE INVENTION

In light of the foregoing background, exemplary embodiments of the present invention provide an apparatus, method and computer-readable storage medium for searching a data source of patient studies, where the data source in one example embodiment is a database. According to one aspect of exemplary embodiments of the present invention, an apparatus is provided that includes a processor and a memory storing executable instructions that in response to execution by the processor cause the apparatus to at least perform a number of operations. The apparatus is caused to receive a query for data from a data source including data organized in one or more tables each of which includes one or more columns of attributes and rows of values under respective columns. The apparatus is caused to receive a rowset of data from the data source in response to the query, where the rowset includes one or more rows of values from the data source.

The apparatus is also caused to convert the rowset to markup data, such as extensible markup language (XML) data, where the markup data includes a plurality of elements each of which has a start tag, an end tag and content therebetween. In this regard, for each row of the rowset, the elements include a row element for which the content includes one or more column elements, and for which the content of each column element includes a value of the respective row.

The apparatus is further caused to organize the row elements of the markup data into a plurality of logical groups each of which includes one or more rows from the data source, such as according to user-configurable parameters identifying the logical groups and including an indication of the row(s) of each of the respective logical groups. The organized markup data further includes a plurality of group elements, where for each group element, the content includes one or more row elements for the one or more rows of a respective logical group. According to various example embodiments, the rowset is converted to markup data, and the row elements of the markup data are organized, to prepare the organized data for transformation to an output according to a markup transformation language (e.g., XSLT).

In one example, the apparatus may be caused to organize the row elements of the markup data into a plurality of logical groups, and within each logical group, organize the row elements into a plurality of logical sub-groups each of which includes one or more rows from the data source. In this example, the organized markup data may further include a plurality of sub-group elements. For each group element, the content may include at least some of the sub-group elements for each of which the content includes one or more row elements for one or more rows of a respective logical sub-group which are also one or more rows of a respective logical group.

The apparatus may be further caused to split the organized markup data into a plurality of smaller markup data sets each of which includes one or more row elements of the organized markup data. In such instances, the apparatus may be caused to separately transform the plurality of smaller markup data sets to portions of the output according to the markup transformation language, and combine the portions of the output to form the output.

The elements of the markup data may further include a rowset element for which the content includes the row element for each row of the rowset. The apparatus, then, may be caused to split the organized markup data such that each smaller markup data set of the plurality of smaller markup data sets includes a rowset element for which the content includes the one or more row elements of the respective smaller markup data set.

In one example, at least two of the logical groups include different numbers of row elements, and each of the smaller markup data sets may include one or more row elements of the organized markup data. In this example, the apparatus may be caused to split the organized markup data such that each of at least some of the plurality of smaller markup data sets includes at least a minimum number of row elements, and such that no two of the smaller markup data sets includes a row element from the same logical group. In one example, the apparatus may be caused to split the organized markup data further such that at least one of the smaller markup data sets includes row elements from more than one logical group.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Further, the apparatus and method of example embodiments of the present invention will be primarily described in conjunction with medical-imaging applications. It should be understood, however, that the apparatus and method can be utilized in conjunction with a variety of other applications, both in the medical industry and outside of the medical industry. Like numbers refer to like elements throughout.

Figure 1:
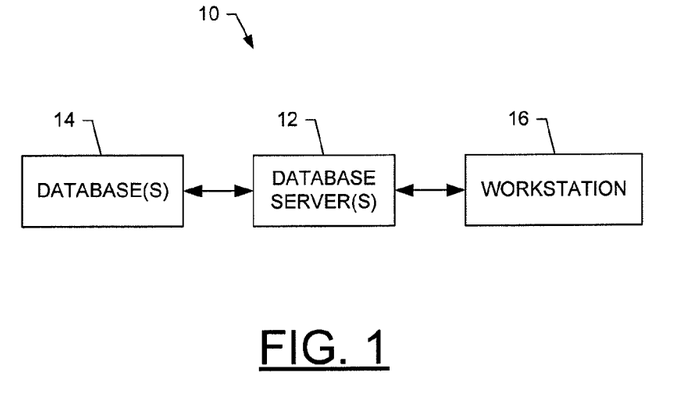
FIG. 1 is a schematic block diagram of a system configured to operate in accordance with exemplary embodiments of the present invention.

FIG. 1 illustrates a system 10 that may benefit from exemplary embodiments of the present invention ("exemplary" as used herein referring to "serving as an example, instance or illustration"). Exemplary embodiments of the present invention may be directed to retrieving data from a data source, which may be any of a number of different types of data sources that may produce data in a tabular result set of rows and columns. As shown and described herein, one suitable data source is a database. In this regard, the system may include one or more database servers 12 configured to manage data stored in one or more databases 14 or other central storage devices. The database may be configured according to any of a number of different database models, but in one example, the database may be configured according to the relational model (i.e., the database may be a relational database). In this regard, the database may store data in a number of tables that may be organized or otherwise structured according to any of a number of different database schema, and each of which may include one or more columns of attributes and rows (records or tuples) of values.

Figure 2:
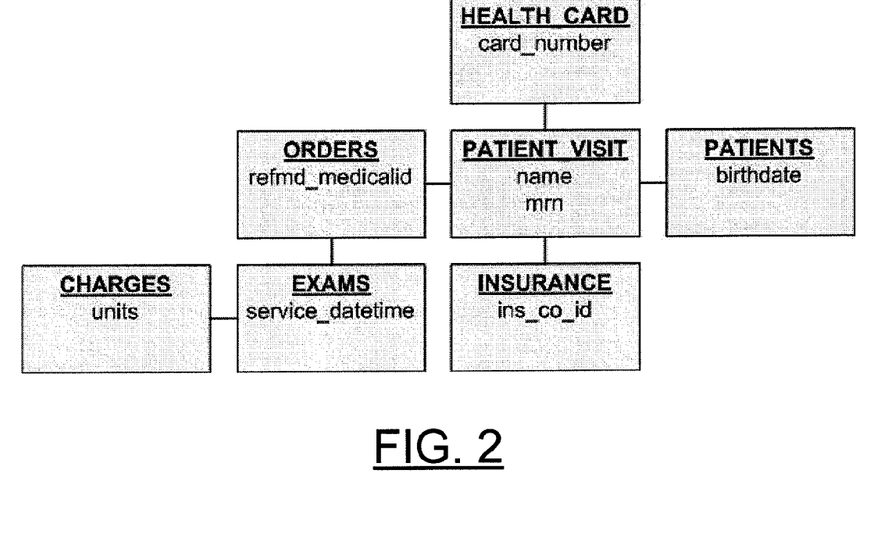
FIG. 2 illustrates an example database schema of a database of patient data, according to one example embodiment of the present invention.

The database 14 may store any of a number of different types of data, but in one exemplary embodiment, the database may store data regarding one or more medical patients. FIG. 2 illustrates an example database schema of a database of patient data, where the schema illustrates a number of tables (e.g., "patients," "patient visit," "insurance," etc.) and columns of the respective tables (e.g., "birthdate," "name," mrn," "ins_co_id," etc.)—"mrn" referencing a medical record number. In one example embodiment, the database server(s) 12 and database(s) may form part of one or more of a hospital information system (HIS), radiology information system (RIS), picture archiving and communication system (PACS) or the like. The database server(s) may therefore include a HIS server, RIS server, PACS server or the like, each of which is configured to interface with a respective database. In other example embodiments, the database server(s) may include a database server configured to support multiple ones of a HIS, RIS and/or PACS server, logically separated but co-located within the respective server.

The system may include one or more workstations 16 configured to receive data from the database server 12, and present the data to a user. Similar to the database server(s), in one example, the workstation(s) may be workstation(s) of one or more of a HIS, RIS, PACS or the like. The workstation(s) may therefore include a HIS workstation, RIS workstation, PACS workstation or the like, each of which is configured to interface with a respective database server and database 14. In other example embodiments, the workstation(s) may include a workstation configured to support multiple ones of a HIS, RIS and/or PACS workstation, logically separated but co-located within the respective workstation.

The database server 12, database 14 and/or workstation 16 may be configured to directly and/or indirectly communicate with one another in any of a number of different manners including, for example, any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G, 3G or 4G communication techniques, local area network (LAN), wireless LAN (WLAN) techniques or the like. In accordance with various ones of these techniques, the database server, database and/or workstation may be coupled to and configured to communicate across one or more networks. The network(s) may include any of a number of different combinations of one or more different types of networks, including data and/or voice networks. For example, the network(s) may include one or more data networks, such as a LAN, a metropolitan area network (MAN), and/or a wide area network (WAN) (e.g., Internet), and include one or more voice networks, such as a public-switched telephone network (PSTN). Although not shown, the network(s) may include one or more apparatuses such as one or more routers, switches or the like for relaying data, information or the like between the database server, database and/or workstation.

Figure 3:
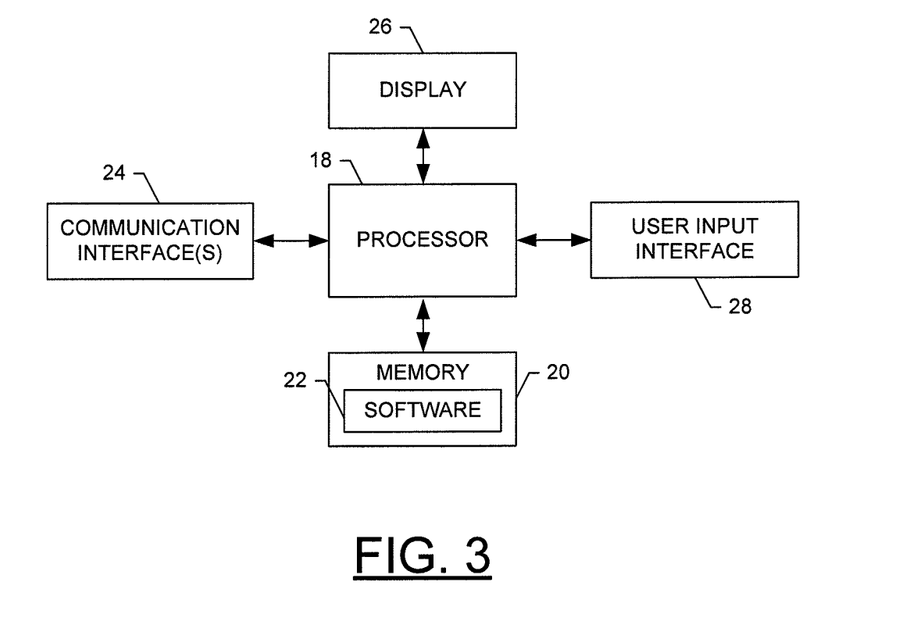
FIG. 3 is a schematic block diagram of an apparatus that may be configured to operate as or otherwise perform one or more functions of one or more of the components of the system of FIG. 1, in accordance with example embodiments of the present invention.

Reference is now made to FIG. 3, which illustrates a block diagram of an apparatus that may be configured to operate as or otherwise perform one or more functions of a database server 12, database 14 and/or workstation 16. Although shown in FIG. 1 as separate apparatuses, in some embodiments, one or more of the respective apparatuses may support more than one of a database server, database and/or workstation, logically separated but co-located within the apparatus (es). For example, a single apparatus may support a logically separate, but co-located database server and database; and in the same or another example, a single apparatus may support a logically separate, but co-located database server and workstation.

Generally, the apparatus of exemplary embodiments of the present invention may comprise, include or be embodied in one or more fixed electronic devices, such as one or more of a desktop computer, workstation computer, server computer or the like. Additionally or alternatively, the apparatus may comprise, include or be embodied in one or more portable electronic devices, such as one or more of a mobile telephone, portable digital assistant (PDA), tablet computer, laptop computer or the like. The apparatus of exemplary embodiments of the present invention includes various means for performing one or more functions in accordance with exemplary embodiments of the present invention, including those more particularly shown and described herein. It should be understood, however, that one or more of the apparatuses may include alternative means for performing one or more like functions, without departing from the spirit and scope of the present invention.

As shown in FIG. 3, the apparatus may include a processor 18 connected to a memory 20. The memory may include volatile and/or non-volatile memory, and typically stores content, data or the like. In this regard, the memory may store one or more software applications 22, modules, instructions or the like for the processor to perform steps associated with operation of the apparatus in accordance with embodiments of the present invention. The memory may also store content transmitted from, and/or received by, the apparatus. As described herein, the software application(s) may each comprise software operated by the apparatus. It should be understood, however, that any one or more of the software applications described herein may alternatively be implemented by firmware, hardware or any combination of software, firmware and/or hardware, without departing from the spirit and scope of the present invention. Also, in one example, the apparatus may support hardware virtualization and/or hardware-assisted virtualization.

In addition to the memory 20, the processor 18 may also be connected to at least one interface or other means for displaying, transmitting and/or receiving data, content or the like, such as in accordance with USB, RF, BT, IrDA, WLAN, LAN, MAN, WAN (e.g., Internet), PSTN techniques or the like. In this regard, the interface(s) may include at least one communication interface 24 or other means for transmitting and/or receiving data, content or the like. In addition to the communication interface(s), the interface(s) may also include at least one user interface that may include one or more earphones and/or speakers, a display 26, and/or a user input interface 28. The user input interface, in turn, may include any of a number of devices allowing the apparatus to receive data from a user, such as a microphone, a keypad, a touch-sensitive surface (integral or separate from the display), a joystick, or other input device.

Figure 4:
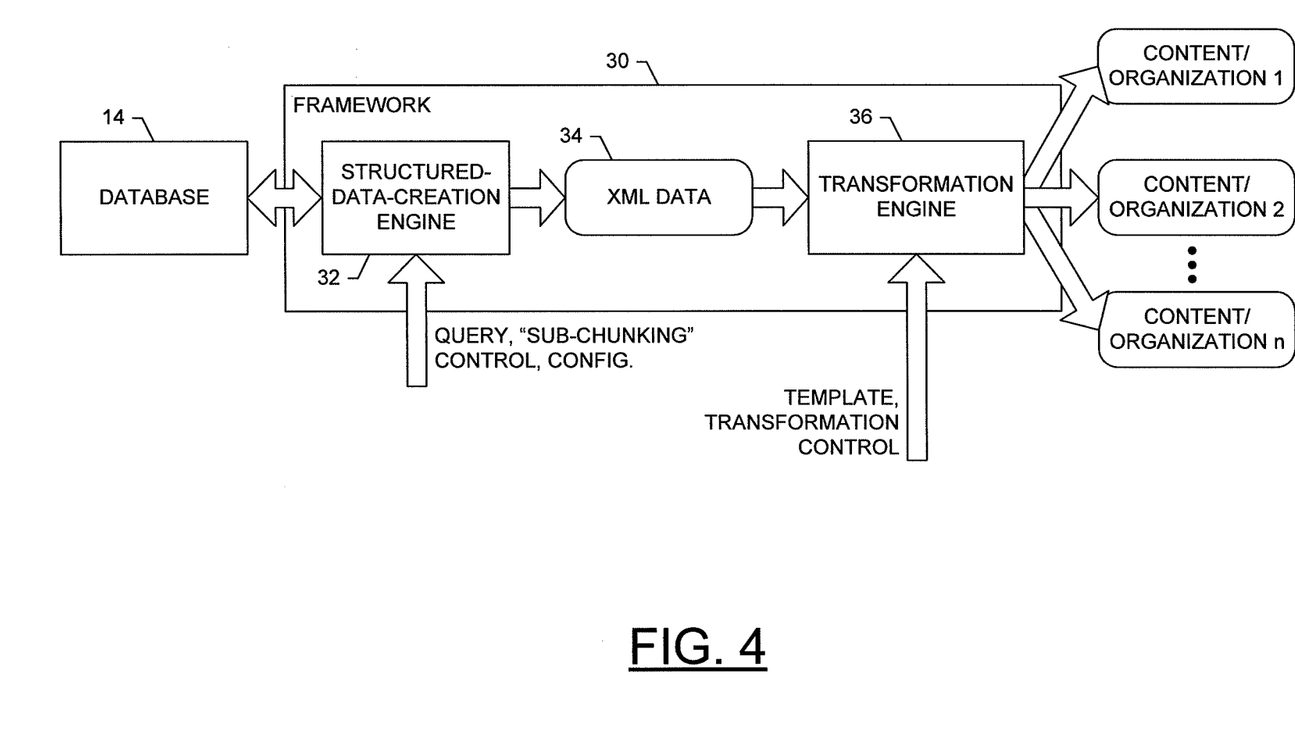
FIG. 4 illustrates a functional framework for retrieving data from a database, in accordance with example embodiments of the present invention.

As explained in the background section, the retrieval of data from a database is a fairly common task, although the desired content and format of the respective data may vary depending on the application of the data. Techniques have been developed to convert database data to a desired output, but may of these techniques suffer from a number of drawbacks. Referring now to FIG. 4, example embodiments of the present invention therefore provide an improved framework 30 for retrieving data from a database 14. As shown and described herein, the framework may be implemented by the database server 12 or workstation 16, or in other examples, portions of the framework may be implemented by each of the database server and workstation.

As shown in FIG. 3, the framework 30 of example embodiments of the present invention generally includes a structured-data-creation engine 32 configured to receive a database query, query the database 14 for data matching the query and create an organized output of the data. The organized output may include intermediate data formatted in a number of different manners, but in one example embodiment, may be formatted as markup data. The markup data, in turn, may be formatted in accordance with any of a number of different markup languages, such as in accordance with extensible markup language (XML) in the case of XML data 34.

The XML data 34 may be received by a transformation engine 36, which may be configured to transform the XML data to a desired output such as in accordance with an XML transformation language. The data may be output from the transformation engine with an organization as output by the structured-data-creation engine 32, which may vary from instance to instance. FIG. 4 shows three different organizations of data retrieved from the database 14. The functions performed by the components of the framework will now be more particularly described below.

The structured-data-creation engine 32 may be configured to receive a database query, such as a structured query language (SQL) database query, and query the database 14 for data matching the query. The returned data may be a result set including a rowset of one or more records (rows) from the database, each of which may have a value in one or more columns from the database. The structured-data-creation engine may then create organized XML data from the database result set. Notably, the structured-data-creation engine may receive a control parameters, one or more of which may include an indication of whether the XML data or its corresponding organized XML data should be stored in memory.

The structured-data-creation engine 32 may create the organized XML data from the database result set in any of a number of different manners. In one example, the creation of organized XML data may include converting the database result set to corresponding XML data structured according to a flat file database model. The database result set may be converted in a number of different manners, such as by marking up the database result set with structural markers such as XML tags that delineate a number of XML elements. For example, the XML data may include a rowset element set off by a set of tags designating the database rowset (e.g., <ROWSET> . . . </ROWSET>). Within the rowset element, the XML data may include a row element for each row of the rowset, where each row element may be set off by a set of tags designating the row (e.g., <ROW> . . . </ROW>). Further, for example, within each row element, the XML data may include a column element for each value of the row, where each column element may be set off by a respective set of tags designating the column between which the value is located (e.g., <COLUMN> . . . </COLUMN>). Each set of tags of an XML element may have any of a number of different labels, such as a label that generally or specifically refers to the respective element. In one example, the rowset and row tags may have general labels, and the column tags may have specific labels corresponding to the names of the columns of the database in which the values are located.

Figure 5:
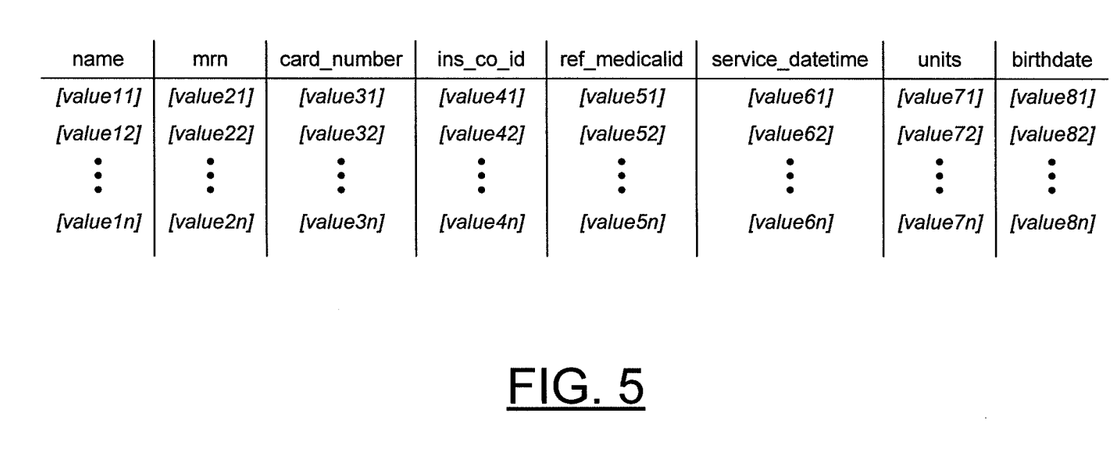
FIG. 5 is an example database result set that may be retrieved according to example embodiments of the present invention.

Continuing the example illustrated in FIG. 2, consider the following database result set shown in FIG. 5. In accordance with example embodiments of the present invention, the structured-data-creation engine 32 may be configured to convert the database result set to XML data as follows:

```
<ROWSET>
    <ROW>
        <NAME> [value11] </NAME>
        <MRN> [value21] </MRN>
        <CARD_NUMBER> [value31] </CARD_NUMBER>
        <INS_CO_ID> [value41] </ INS_CO_ID>
        <REF_MEDICALID> [value51] </REF_MEDICALID>
        <SERVICE_DATETIME> [value61]
        </SERVICE_DATETIME>
        <UNITS> [value71] </UNITS>
        <BIRTHDATE> [value81] </BIRTHDATE>
    </ROW>
    <ROW>
        <NAME> [value12] </NAME>
        <MRN> [value22] </MRN>
        <CARD_NUMBER> [value32] </CARD_NUMBER>
        <INS_CO_ID> [value42] </ INS_CO_ID>
        <REF_MEDICALID> [value52] </REF_MEDICALID>
        <SERVICE_DATETIME> [value62]
        </SERVICE_DATETIME>
        <UNITS> [value72] </UNITS>
        <BIRTHDATE> [value82] </BIRTHDATE>
    </ROW>
    ...
    <ROW>
        <NAME> [value1n] </NAME>
        <MRN> [value2n] </MRN>
        <CARD NUMBER> [value3n] </CARD NUMBER>
        <INS_CO_ID> [value4n] </ INS_CO_ID>
        <REF_MEDICALID> [value5n] </REF_MEDICALID>
        <SERVICE_DATETIME> [value6n]
```

```
        </SERVICE_DATETIME>
        <UNITS> [value7n] </UNITS>
        <BIRTHDATE> [value8n] </BIRTHDATE>
    </ROW>
</ROWSET>
```

To enable the framework 30 to output data organized in any of a number of different manners, the structured-data-creation engine 32 may be further configured to organize the XML data into a plurality of logical groups, such as according to a process referred to herein as "sub-chunking." According to exemplary embodiments, the logical groups may be user configurable, and may be of any size, at any level of the result set, and any nomenclature. In one example, the structured-data-creation engine may be configured to receive control parameters according to which to sub-chunk the XML data. These parameters, in turn, may identify a plurality of logical groups, and for each group, include an indication of one or more rows to be placed in the group. In accordance with the sub-chunking process, then, the structured-data-creation engine 32 may then be configured to traverse the XML data and organize the rows into logical groups based upon the respective control parameters.

The indication of the rows to be placed in a group may be reflected in any of a number of different manners. In one example, the control parameters may indicate an alternate grouping of two rows and one row based on the number of rows processed. This may be reflected as follows:

```
<ROWSET>
    <GROUP OF 2>
        <ROW> ... </ROW>
        <ROW> ... </ROW>
    </GROUP OF 2>
    <GROUP OF 1>
        <ROW> ... </ROW>
    </GROUP OF 1>
    <GROUP OF 2>
        <ROW> ... </ROW>
        <ROW> ... </ROW>
    </GROUP OF 2>
    ...
</ROWSET>
```

In another example, indication of the rows to be placed in a group may reflect data value(s) of rows to be placed in a group. More particularly, for example, the XML data may be organized into groups by patient birth month (e.g., January, February, etc.), which may be identified by the birth date (birthdate) values. In another example, the XML data may be organized into groups by insurance carrier (e.g., United-Health, WellPoint, Aetna, etc.), which may be identified by insurance company identifier (ins_co_id) values. In yet another example, the XML data may be organized into groups by the first letter of a patient's last name (e.g., A-L, M-Z), which may be identified by patient name (name) values. Notably, the XML data may be organized into a plurality of logical groups, and one or more of the logical groups may be further organized into a plurality of subgroups, and even further one or more of the logical sub-groups may be organized into a plurality of sub-subgroups, and so forth. Thus, as explained herein, reference to a logical group may equally apply to a subgroup, sub-subgroup, and so forth.

Also notably, the control parameters for sub-chunking the XML data may identify logical groups such that each of the row elements fits in one of the groups, such as in the case of logical groups by birth month. In other instances, the control parameters may not identify logical groups such that each row fits in one of the groups, such as in the case of logical groups by insurance company where some but not all possible insurance companies are identified or some patients do not have insurance. In these other instances, the control parameters may further identify or the structured-data-creation engine 32 may create an "other" group into which rows including values that do not fit within another group may be placed, and/or a "none" group into which rows not including a value in the appropriate column(s).

The structured-data-creation engine 32 may reflect the logical groups in the organized XML data set in any of a number of different manners, such as by adding XML elements for the groups to the XML data, and organizing the row elements within the respective group elements. For example, within the rowset element, the XML data may include an XML element for each logical group, which may be set off by a respective set of tags designating the logical group (e.g., <GROUP> . . . </GROUP>). The group element for each logical group, then, may include a row element for each row including data value(s) associated with the respective logical group. Similar to the other elements of the XML data, each set of tags of a group element may have any of a number of different labels, such as a label that generally or specifically refers to the respective element.

Continuing the above example, consider an instance in which the XML data is sub-chunked by patient birth month, and within the birth month groups, by first letter of the patient's last name, and further within the last name groups, by insurance carrier. In this instance, the organized XML data in may appear as follows:

```
<ROWSET>
    <JANUARY BIRTH MONTH>
        <"A" TO "L" LAST NAME>
            <UNITEDHEALTH>
                <ROW> ... </ROW>
                ...
                <ROW> ... </ROW>
            </UNITEDHEALTH>
            ...
            <OTHER INSURANCE>
                <ROW> ... </ROW>
                ...
                <ROW> ... </ROW>
            </OTHER INSURANCE>
        </"A" TO "L" LAST NAME>
        <"M" TO "Z" LAST NAME>
            <UNITEDHEALTH>
                <ROW> ... </ROW>
                ...
                <ROW> ... </ROW>
            </UNITEDHEALTH>
            ...
            <OTHER INSURANCE>
                <ROW> ... </ROW>
                ...
                <ROW> ... </ROW>
            </OTHER INSURANCE>
        </"M" TO "Z" LAST NAME>
    </JANUARY BIRTH MONTH>
    ...
    <DECEMBER BIRTH MONTH>
        <"A" TO "L" LAST NAME>
            <UNITEDHEALTH>
                <ROW> ... </ROW>
                ...
                <ROW> ... </ROW>
            </UNITEDHEALTH>
            ...
            <OTHER INSURANCE>
```

```
            <ROW> ... </ROW>
               ...
            <ROW> ... </ROW>
         </OTHER INSURANCE>
      </"A" TO "L" LAST NAME>
      <"M" TO "Z" LAST NAME>
         <UNITEDHEALTH>
            <ROW> ... </ROW>
               ...
            <ROW> ... </ROW>
         </UNITEDHEALTH>
            ...
         <OTHER INSURANCE>
            <ROW> ... </ROW>
               ...
            <ROW> ... </ROW>
         </OTHER INSURANCE>
      </"M" TO "Z" LAST NAME>
   </DECEMBER BIRTH MONTH>
</ROWSET>
```

Even further, to address concerns/known problems with processing too many records at once, the structured-data-creation engine 32 may implement a technique referred to as "chunking" whereby the organized XML data may be split into a configurable number of smaller sub-rowsets, each of which may be set off by respective rowset tags. The structured-data-creation engine may create intermediate data for each of the sub rowsets, which the transformation engine 36 may later transform and recombine into its output data. This may reduce the load on processing and/or memory resources during the retrieval process.

The structured-data-creation engine 32 may receive a configuration parameter indicating a chunk size indicating the minimum number of rows of the organized XML data that may be included in one of the smaller sets. In accordance with the chunking process, then, the structured-data-creation engine 32 may then be configured to traverse the organized XML data and create smaller sets of rows of the data based upon the respective control parameters. Notably, however, the chunk size does not indicate a requirement of the exact number of rows in the smaller sets, as the logical groups may also affect the number of rows in the smaller sets. In this regard, the number of rows in a smaller set may be determined so that the smaller sets do not break between logical groups.

Thus, in an instance in which the structured-data-creation engine 32 creating a current one of the smaller sets reaches the chunk size but the last row in the set and the next row of the organized XML data are part of the same logical group, the structured-data-creation engine may but need not throttle chunking the organized XML data (delay ending the current smaller set and begin creating the next smaller set) until reaching the last row of the respective logical group. On placing the last row of the respective logical group in the current smaller set, the structured-data-creation engine may move on to create the next smaller set. The organized XML data may therefore be split such that each of at least some of the smaller XML data sets includes at least the chunk-size number of row elements, and such that no two of the smaller XML data sets includes a row element from the same logical group. Notably, however, any smaller XML data set may include row elements from more than one logical group.

To further illustrate the chunking process, consider the following example logical groups by insurance carrier, including an "Insurance0" group including one row element, a UnitedHealth group including four row elements, and a WellPoint group including one row element. Also consider that the chunk size has been set to two rows.

```
<INSURANCE0>
   <ROW1> ... </ROW1>
</INSURANCE0>
<UNITEDHEALTH>
   <ROW1> ... </ROW1>
   <ROW2> ... </ROW2>
   <ROW3> ... </ROW3>
   <ROW4> ... </ROW4>
</UNITEDHEALTH>
<WELLPOINT>
   <ROW1> ... </ROW1>
</WELLPOINT>
```

In this example, the structured-data-creation engine 32 may chunk the XML data according to the chunk size, and may achieve smaller sets including one set with the one row of the Insurance0 group, and the first row the UnitedHealth group, one set with the second and third rows of the UnitedHealth group, and one set with the remaining row of the UnitedHealth group and the one row of the WellPoint group. This may be reflected as follows:

```
<ROWSET>
   <INSURANCE0>
      <ROW1> ... </ROW1>
   </INSURANCE0>
   <UNITEDHEALTH>
      <ROW1> ... </ROW1>
   </UNITEDHEALTH>
</ROWSET>
<ROWSET>
   <UNITEDHEALTH>
      <ROW2> ... </ROW2>
      <ROW3> ... </ROW3>
   </UNITEDHEALTH>
</ROWSET>
<ROWSET>
   <UNITEDHEALTH>
      <ROW4> ... </ROW4>
   </UNITEDHEALTH>
   <WELLPOINT>
      <ROW1> ... </ROW1>
   </WELLPOINT>
</ROWSET>
```

As it may be desirable to maintain the rows of a group together after transformation of the organized XML data, in one example, the structured-data-creation engine 32 may throttle the chunking process when it reaches the second row of the UnitedHealth group. That is, upon traversing the one row of the Insurance0 group and the first row of the UnitedHealth group (i.e., the minimum number of rows set by the chunk size), the structured-data-creation engine may recognize that the next row belongs to the same group as the second row and continue adding rows to the respective smaller set. The structured-data-creation engine may recognize that the first row of the WellPoint group is for a different group than the fourth row of the UnitedHealth group, and begin a new smaller set. The structured-data-creation engine may therefore achieve the following two smaller sets:

```
<ROWSET>
   <INSURANCE0>
      <ROW1> ... </ROW1>
   </INSURANCE0>
   <UNITEDHEALTH>
      <ROW1> ... </ROW1>
```

```
        <ROW2> ... </ROW2>
        <ROW3> ... </ROW3>
        <ROW4> ... </ROW4>
    </UNITEDHEALTH>
</ROWSET>
<ROWSET>
    <WELLPOINT>
        <ROW1> ... </ROW1>
    </WELLPOINT>
</ROWSET>
```

As indicated above, the organized, split XML data 34 may be received by the transformation engine 36, which may be configured to transform the XML data to a desired output such as in accordance with an XML transformation language. The transformation engine may be configured to transform the XML data in accordance with any of a number of XML transformation languages, such as for example the extensible stylesheet language transformations (XSLT). In accordance with XSLT, the transformation engine may be configured to receive the XML data, and also receive a stylesheet including one or more sets of rules referred to as templates. The transformation engine may then process the XML data and stylesheet to produce the desired output. More particularly, for example, the transformation engine may separately transform the plurality of smaller XML data sets to portions of the output, and combine the portions of the output to form the output.

Notably, the transformation engine 36 may receive a number of control parameters according to which it may transform the XML data 34. These control parameters may include, for example, a time between transformations of the smaller XML data sets, an indication of whether its output should be stored in memory, and/or numbers of the portions of the output to combine at once.

Figure 6:
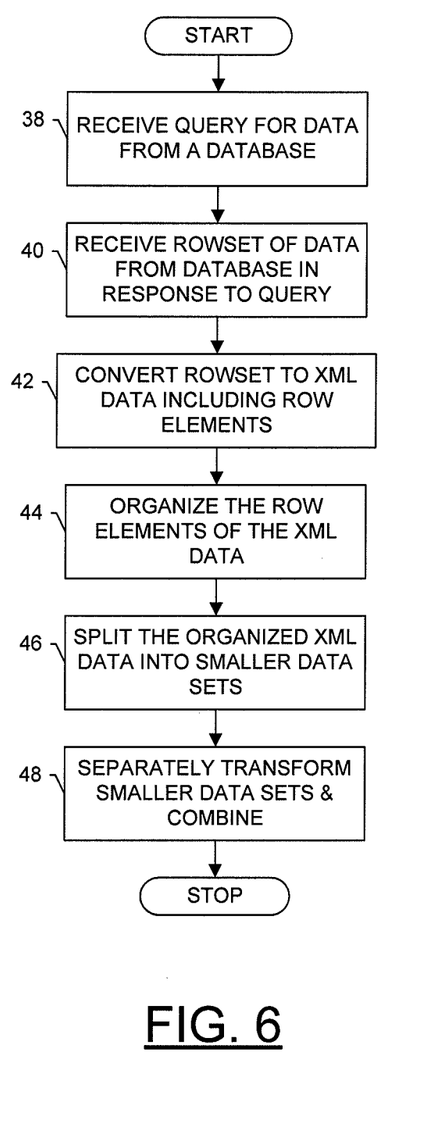
FIG. 6 is a flowchart illustrating various operations in a method according to exemplary embodiments of the present invention.

Reference is now made to FIG. 6, which illustrates various operations in a method according to one example embodiment of the present invention, the operations of which in one example may be performed by the framework 30. As shown in block 38, the method may include receiving a query for data from a data source (e.g., database) including data organized in one or more tables each of which includes one or more columns of attributes and rows of values under respective columns. The method may also include receiving a rowset of data from the data source in response to the query, where the rowset includes one or more rows of values from the data source, as shown in block 40.

The method may also include converting the rowset to markup (e.g., XML) data, where the markup data includes a plurality of elements each of which has a start tag, an end tag and content therebetween, as shown in block 42. In this regard, for each row of the rowset, the elements include a row element for which the content includes one or more column elements, and for which the content of each column element includes a value of the respective row.

As shown in block 44, the method may further include organizing the row elements of the markup data into a plurality of logical groups each of which includes one or more rows from the data source, such as according to user-configurable parameters identifying the logical groups and including an indication of the row(s) of each of the respective logical groups. The organized markup data further includes a plurality of group elements, where for each group element, the content includes one or more row elements for the one or more rows of a respective logical group. According to various example embodiments, the rowset is converted to markup data, and the row elements of the markup data are organized, to prepare the organized data for transformation to an output according to a markup transformation language (e.g., XSLT), as shown in block 46.

In one example, organizing the row elements may include organizing the row elements of the markup data into a plurality of logical groups, and within each logical group, organizing the row elements into a plurality of logical sub-groups each of which includes one or more rows from the data source. In this example, the organized markup data may further include a plurality of sub-group elements. For each group element, the content may include at least some of the sub-group elements for each of which the content includes one or more row elements for one or more rows of a respective logical sub-group which are also row(s) of a respective logical group.

The method further includes splitting the organized markup data into a plurality of smaller markup data sets each of which includes one or more row elements of the organized markup data, as shown in block 46. In such instances, the apparatus may be caused to separately transform the plurality of smaller markup data sets to portions of the output according to the markup transformation language, and combine the portions of the output to form the output, as shown in block 48.

The elements of the markup data may further include a rowset element for which the content includes the row element for each row of the rowset. Splitting the organized markup data, then, may include splitting the organized markup data such that each smaller markup data set of the plurality of smaller markup data sets includes a rowset element for which the content includes the one or more row elements of the respective smaller markup data set.

In one example, at least two of the logical groups include different numbers of row elements, and each of the smaller markup data sets may include one or more row elements of the organized markup data. In this example, splitting the organized markup data may include splitting the organized markup data such that each of at least some of the plurality of smaller markup data sets includes at least a minimum number of row elements, and such that no two of the smaller markup data sets includes a row element from the same logical group. In one example, the method may include splitting the organized markup data further such that at least one of the smaller markup data sets includes row elements from more than one logical group.

According to one aspect of the present invention, all or a portion of the database server 12, database 14 and/or workstation 16 of exemplary embodiments of the present invention, generally operate under control of a computer program. The computer program for performing the methods of exemplary embodiments of the present invention may include one or more computer-readable program code portions, such as a series of computer instructions, embodied or otherwise stored in a computer-readable storage medium, such as the non-volatile storage medium.

FIG. 6 is a flowchart reflecting methods, systems and computer programs according to exemplary embodiments of the present invention. It will be understood that each block or step of the flowchart, and combinations of blocks in the flowchart, may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the flowchart. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the flowchart. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowchart.

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least:
    receive a query for data from a data source including data organized in one or more tables each of which includes one or more columns of attributes and rows of values in respective columns;
    receive a rowset of data from the data source in response to the query, the rowset including one or more rows of values from the data source;
    convert the rowset to markup data, wherein the markup data includes a plurality of elements each of which has a start tag, an end tag and content therebetween, wherein for each row of the rowset, the elements include a row element for which the content includes one or more column elements, and for which the content of each column element includes a value of the respective row;
    organize the row elements of the markup data into a plurality of logical groups each of which includes one or more rows from the data source, wherein the organized markup data further includes a plurality of group elements, wherein for each group element, the content includes one or more row elements for the one or more rows of a respective logical group;
    split the organized markup data of at least one of the logical groups into a plurality of smaller markup data sets, each of the smaller markup data sets including one or more row elements of the organized markup data of the at least one of the logical groups;
    wherein the rowset is converted to markup data, and the row elements of the markup data are organized, to prepare the organized data for transformation to an output according to a markup transformation language.

2. The apparatus of claim 1, wherein the apparatus being caused to organize the row elements includes being caused to organize the row organizing the row elements of the markup data according to user-configurable parameters identifying the logical groups and including an indication of the one or more rows of each of the respective logical groups.

3. The apparatus of claim 1, wherein the apparatus being caused to organize the row elements includes being caused to organize the row elements of the markup data into a plurality of logical groups, and within each logical group, organize the row elements into a plurality of logical sub-groups each of which includes one or more rows from the data source,
    wherein the organized markup data further includes a plurality of sub-group elements, wherein for each group element, the content includes at least some of the sub-group elements for each of which the content includes one or more row elements for one or more rows of a respective logical sub-group which are also one or more rows of a respective logical group.

4. The apparatus of claim 1, wherein the memory stores further executable instructions that in response to execution by the processor cause the apparatus to further:
    separately transform the plurality of smaller markup data sets to portions of the output according to the markup transformation language; and
    combine the portions of the output to form the output.

5. The apparatus of claim 4, wherein at least two of the logical groups include different numbers of row elements, wherein each of the smaller markup data sets includes one or more row elements of the organized markup data, and
    wherein the apparatus being caused to split the organized markup data includes being caused to split the organized markup data such that each of at least some of the plurality of smaller markup data sets includes at least a minimum number of row elements, and such that no two of the smaller markup data sets includes a row element from the same logical group.

6. The apparatus of claim 5, wherein the apparatus being caused to split the organized markup data includes being caused to split the organized markup data further such that at least one of the smaller markup data sets includes row elements from more than one logical group.

7. The apparatus of claim 4, wherein the elements of the markup data further include a rowset element for which the content includes the row element for each row of the rowset, and
    wherein the apparatus being caused to split the organized markup data includes being caused to split the organized markup data such that each smaller markup data set of the plurality of smaller markup data sets includes a rowset element for which the content includes the one or more row elements of the respective smaller markup data set.

8. The computer-readable storage medium of claim 4, wherein the elements of the markup data further include a rowset element for which the content includes the row element for each row of the rowset, and
    wherein the apparatus being caused to split the organized markup data includes being caused to split the organized markup data such that each smaller markup data set of the plurality of smaller markup data sets includes a rowset element for which the content includes the one or more row elements of the respective smaller markup data set.

9. A method comprising:
receiving a query for data from a data source including data organized in one or more tables each of which includes one or more columns of attributes and rows of values in respective columns;
receiving a rowset of data from the data source in response to the query, the rowset including one or more rows of values from the data source;
converting the rowset to markup data, wherein the markup data includes a plurality of elements each of which has a start tag, an end tag and content therebetween, wherein for each row of the rowset, the elements include a row element for which the content includes one or more column elements, and for which the content of each column element includes a value of the respective row; and
organizing the row elements of the markup data into a plurality of logical groups each of which includes one or more rows from the data source, wherein the organized markup data further includes a plurality of group elements, wherein for each group element, the content includes one or more row elements for the one or more rows of a respective logical group;
splitting the organized markup data of at least one of the plurality of logical groups into a plurality of smaller markup data sets each of which includes one or more row elements of the organized markup data of the at least one of the plurality of logical groups;
wherein the rowset is converted to markup data, and the row elements of the markup data are organized, to prepare the organized data for transformation to an output according to a markup transformation language, and
wherein converting the rowset to markup data and organizing the row elements of the markup data are performed by an apparatus including a processor and a memory storing executable instructions that in response to execution by the processor cause the apparatus to at least convert the rowset to markup data and organize the row elements of the markup data.

10. The method of claim 9, wherein organizing the row elements includes organizing the row elements of the markup data according to user-configurable parameters identifying the logical groups and including an indication of the one or more rows of each of the respective logical groups.

11. The method of claim 9, wherein organizing the row elements includes organizing the row elements of the markup data into a plurality of logical groups, and within each logical group, organizing the row elements into a plurality of logical sub-groups each of which includes one or more rows from the data source,
wherein the organized markup data further includes a plurality of sub-group elements, wherein for each group element, the content includes at least some of the sub-group elements for each of which the content includes one or more row elements for one or more rows of a respective logical sub-group which are also one or more rows of a respective logical group.

12. The method of claim 9 further comprising:
separately transforming the plurality of smaller markup data sets to portions of the output according to the markup transformation language; and
combining the portions of the output to form the output.

13. The method of claim 12, wherein at least two of the logical groups include different numbers of row elements, wherein each of the smaller markup data sets includes one or more row elements of the organized markup data, and
wherein splitting the organized markup data includes splitting the organized markup data such that each of at least some of the plurality of smaller markup data sets includes at least a minimum number of row elements, and such that no two of the smaller markup data sets includes a row element from the same logical group.

14. The method of claim 13, wherein splitting the organized markup data includes splitting the organized markup data further such that at least one of the smaller markup data sets includes row elements from more than one logical group.

15. The method of claim 12, wherein the elements of the markup data further include a rowset element for which the content includes the row element for each row of the rowset, and
wherein splitting the organized markup data includes splitting the organized markup data such that each smaller markup data set of the plurality of smaller markup data sets includes a rowset element for which the content includes the one or more row elements of the respective smaller markup data set.

16. A non-transitory computer readable storage medium having computer-readable program code portions stored therein that, in response to execution by a processor, cause an apparatus to at least:
receive a query for data from a data source including data organized in one or more tables each of which includes one or more columns of attributes and rows of values in respective columns;
receive a rowset of data from the data source in response to the query, the rowset including one or more rows of values from the data source;
convert the rowset to markup data, wherein the markup data includes a plurality of elements each of which has a start tag, an end tag and content therebetween, wherein for each row of the rowset, the elements include a row element for which the content includes one or more column elements, and for which the content of each column element includes a value of the respective row; and
organize the row elements of the markup data into a plurality of logical groups each of which includes one or more rows from the data source, wherein the organized markup data further includes a plurality of group elements, wherein for each group element, the content includes one or more row elements for the one or more rows of a respective logical group;
split the organized markup data of at least one of the plurality of logical groups into a plurality of smaller markup data sets each of which includes one or more row elements of the organized markup data of the at least one of the plurality of logical groups;
separately transform the plurality of smaller markup data sets to portions of an output according to a markup transformation language; and
combine the portions of the output to form the output,
wherein the rowset is converted to markup data, and the row elements of the markup data are organized, to prepare the organized data for transformation to the output according to the markup transformation language.

17. The computer-readable storage medium of claim 16, wherein the apparatus being caused to organize the row elements includes being caused to organize the row by organizing the row elements of the markup data according to user-configurable parameters identifying the logical groups and including an indication of the one or more rows of each of the respective logical groups.

18. The computer-readable storage medium of claim 16, wherein the apparatus being caused to organize the row elements includes being caused to organize the row elements of the markup data into a plurality of logical groups, and within each logical group, organize the row elements into a plurality of logical sub-groups each of which includes one or more rows from the data source,     wherein the organized markup data further includes a plurality of sub-group elements, wherein for each group element, the content includes at least some of the sub-group elements for each of which the content includes one or more row elements for one or more rows of a respective logical sub-group which are also one or more rows of a respective logical group.

19. The computer-readable storage medium of claim 16, wherein the computer-readable storage medium has further computer-readable program code portions stored therein that, in response to execution by the processor, cause the apparatus to further:

separately transform the plurality of smaller markup data sets to portions of the output according to the markup transformation language; and     combine the portions of the output to form the output.

20. The computer-readable storage medium of claim 19, wherein at least two of the logical groups include different numbers of row elements, wherein each of the smaller markup data sets includes one or more row elements of the organized markup data, and     wherein the apparatus being caused to split the organized markup data includes being caused to split the organized markup data such that each of at least some of the plurality of smaller markup data sets includes at least a minimum number of row elements, and such that no two of the smaller markup data sets includes a row element from the same logical group.

21. The computer-readable storage medium of claim 20, wherein the apparatus being caused to split the organized markup data includes being caused to split the organized markup data further such that at least one of the smaller markup data sets includes row elements from more than one logical group.

* * * * *